United States Patent [19]

Houser

[11] 4,134,731
[45] Jan. 16, 1979

[54] COMPOSTING APPARATUS WITH COMMINUTION, MOISTURE CONTROL, AND MASCERATOR MEANS

[75] Inventor: John E. Houser, Marion, Ohio

[73] Assignee: Aerotherm, Inc., Delaware, Ohio

[21] Appl. No.: 728,188

[22] Filed: Sep. 30, 1976

[51] Int. Cl.² .............................................. C05F 9/04
[52] U.S. Cl. ...................................... 195/127; 241/24; 241/DIG. 38; 210/201; 210/220; 209/12
[58] Field of Search .................. 23/259.1; 71/8, 9, 10, 71/14, 64 JC; 209/2, 3, 9, 11, 12, 133; 241/24, DIG. 38; 210/18, 201, 220

[56] References Cited

U.S. PATENT DOCUMENTS

| | | | |
|---|---|---|---|
| 1,897,620 | 2/1933 | Respress | 24/24 |
| 2,554,450 | 5/1951 | Ayers | 241/24 |
| 3,145,935 | 8/1964 | Wilson | 241/24 |
| 3,236,604 | 2/1966 | Pierson | 71/9 |
| 3,236,605 | 2/1966 | Pierson | 23/259.1 |
| 3,246,953 | 4/1966 | Redman et al. | 23/259.1 |
| 3,248,176 | 4/1966 | Pierson | 71/9 |
| 3,276,845 | 10/1966 | Redman | 71/8 |
| 3,524,594 | 8/1970 | Anderson | 241/24 |
| 3,579,320 | 5/1971 | Pesses | 241/DIG. 38 |
| 3,650,396 | 3/1972 | Gillespie | 241/DIG. 38 |
| 3,660,038 | 5/1972 | Brewer | 241/24 |
| 3,736,111 | 5/1973 | Gardner et al. | 71/9 |
| 3,790,091 | 2/1974 | Law et al. | 241/24 |
| 3,876,157 | 4/1975 | McIntre | 241/DIG. 38 |
| 3,993,252 | 11/1976 | Ito | 241/DIG. 38 |

FOREIGN PATENT DOCUMENTS 212464  5/1923  United Kingdom ............... 209/11

OTHER PUBLICATIONS

Perry's Chemical Engineers' Handbook 4th edition, McGraw Hill 8-32 and 8-33.

Primary Examiner—Charles N. Hart
Assistant Examiner—Ernest G. Therkurn
Attorney, Agent, or Firm—Sidney W. Millard

[57] ABSTRACT

A system for composting solid waste material wherein in initial treatment stages an optimum particle size is developed at a comminution station following which through an initial air classification arrangement, heavy inorganic materials are segregated to the extent that aluminum, glass and paper characterized products are removed for recycling purposes. A characterizing feature of the invention resides in the development of an optimized moisture content or digestible classified size optimized material at a relatively early stage prior to maceration developing a pulpous substance for digestion. A pug-mill arrangement is utilized for adding optimized moisture prior to digestion and maceration and a cage-mill is utilized for the maceration stage of the process.

17 Claims, 13 Drawing Figures

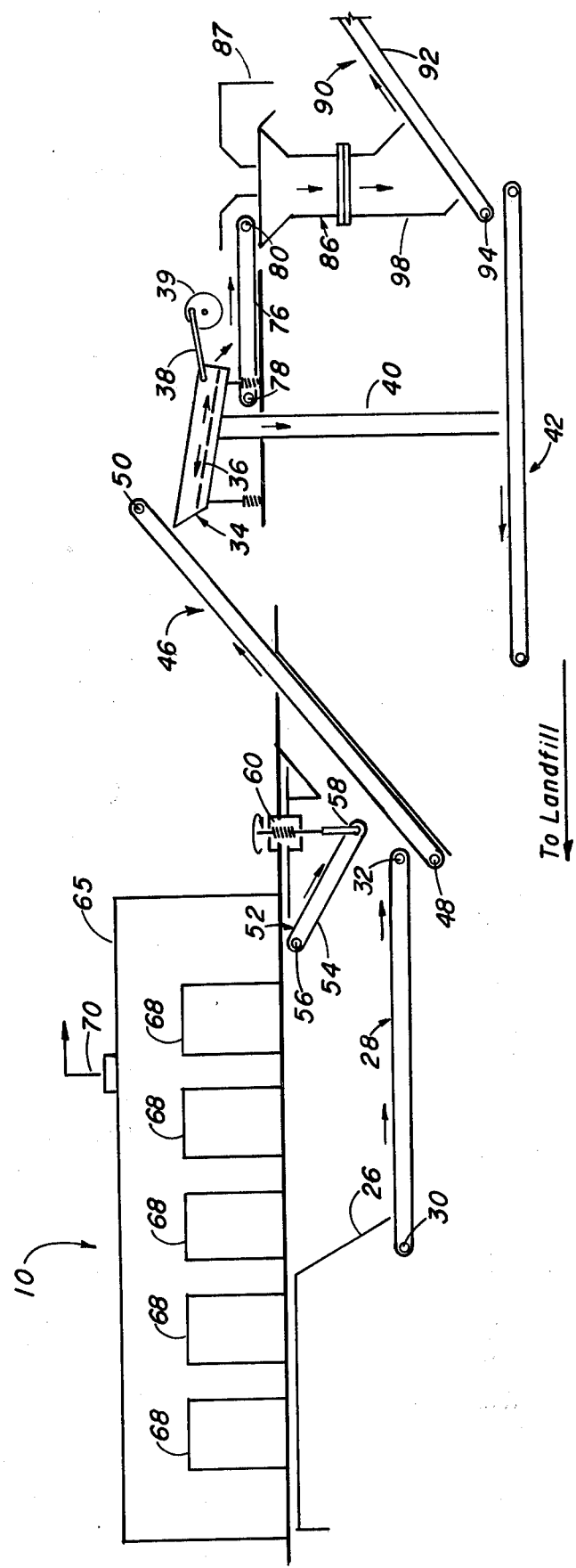

| Fig.2A | Fig.2B | Fig.2C |
|---|---|---|
|  | Fig.2D |  |

| Fig.3A | Fig.3B |
|---|---|

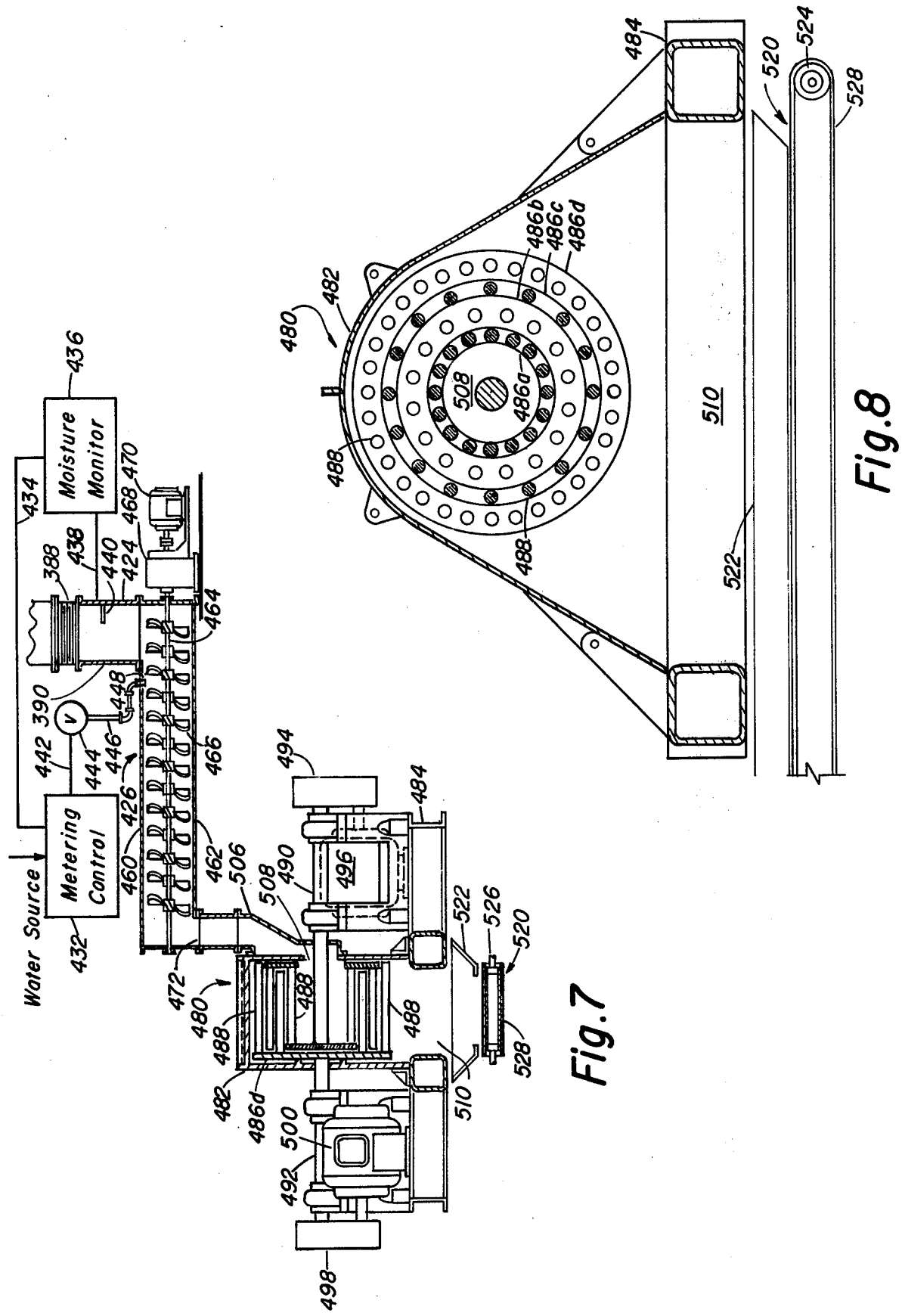

COMPOSTING APPARATUS WITH COMMINUTION, MOISTURE CONTROL, AND MASCERATOR MEANS

BACKGROUND

Controlled composting procedures have been proposed over the past for the purpose of providing an improved disposal of municipal refuse, sewage, sludge, plant waste and similar biode-gradable materials. The advantages attendant with this form of treatment are manyfold, for instance, the compost or end product of the procedures not only represents a significant reduction in waste volume, thereby minimizing land-fill disposal needs, but also, may represent a product of significant commercial value as a carrier, insert or otherwise, for a wide variety of products including fertilizers and the like.

Certain of the digestive systems heretofore proposed look to multi-phase procedures of decomposition. For instance, in one arrangement, as disclosed in U.S. Pat. No. 2,820,703, the waste materials are caused to undergo a fungal mold action, following which a period wherein decomposition is predominantly carried out by bacteria active in a mesophilic phase at temperatures below 45°–50° C. is effected. Generally following such phase, a period of maximum biodegradation is permitted to ensue wherein bacteria in the thermophilic phase at temperatures about 45°–50° C. are witnessed. These multi-phase techniques for waste decomposition, have been observed to exhibit numerous disadvantages when considered for use in most installations. In this regard, more elaborate plant facilities are required, pathogens and the like are present in the noted preliminary digestive phases which lead to health control problems. Further, objectionable odors are witnessed.

Proposals for overcoming these disadvantages through the utilizations of systems operating only in the thermophilic phase and temperature range have been propagated; see for instance U.S. Pat. Nos. 3,010,801; 3,138,448 and 3,285,732 by Schulze.

The effective maintenance of the thermophilic phase of digestion on scales considered practical for municipal disposal systems however, has proved to be an involved and difficult undertaking. Not only is it necessary to assure proper growth of thermophilic bacteria through maintenance of requisite incubation temperatures, but also the biochemical oxygen demand (BOD) of the system must be accommodated for as well as such related pre-digestion process parameters as moisture control, optimum particle size formation and the like. Failure of the system to accommodate for any of these parameters results in an output which is unacceptable both by reason of the failure of a complete digestion thereof as well as by the opportunity for the carrying therewithin of pathogenic materials to render the output useless for further practical or commercial utilization. Typical of the digestive systems proposed to accommodate the manyfold difficulties associated with large scale waste digestive installations are those described in Pierson, U.S. Pat. No. 3,523,012 or Hardy, U.S. Pat. No. 3,114,622. Generally, the difficulties encountered in the development of the systems heretofore proposed appear to have involved a failure of meeting the biochemical oxygen demand of the digestive process, failure to maintain necessary temperatures to achieve thermophilic phase decomposition as well as failure to derive a practical arrangement for developing and maintaining that waste matter water content considered optimum to achieve proper digestion.

SUMMARY

The present invention is addressed to an improved system for composting waste material by aerobic bacterial decomposition. Characterized in providing an optimized pretreatment of solid waste materials prior to the entry thereof into the region of digestive activity, the system achieved improved digestive efficiencies to provide corresponding facility designs of a practical scope suited for accommodating the large waste volumes encountered in municipal disposal systems.

As another feature and object, the system of the invention permits the derivation of highly efficient thermophilic aerobic digestion by so pretreating solid waste material entering the system as to maximize the receptivity of the treated material to preferred digestive activity, thereby considerably enhancing digester efficiency and performance.

With the system, an untreated refuse or starting material initially is collected in typically random fashion through municipally controlled or operated agencies and the like and, in random but statistically determinable manner is temporarily retained at a receiving or collection station. The interval of retention at such station is so limited as to prevent any significant development of anaerobic bacteria or fungus along with the unpleasantly odorous by-products and generally undesirable activity thereof. To control such of these environmental odors as occur, a pick-off arrangement is provided to circulate and convey the air of the immediate surroundings within the receiving station to a later-stage digestive process. From the receiving and collection station, the starting material is moved within the system through a bulk input flow control arrangement, the transfer rate established thereby generally regulating the ultimate output of the treatment system. There follows the carrying out of a function typically denoted as "picking" wherein large component non-digestible refuse such as large appliances, automobile tires, and the like are removed for disposal in land-fill areas. With the removal of these materials, a primary comminution stage is provided which serves to reduce the bulk starting material to a maximum piece or particle size suited both to facilitate recycle separation stages, for instance the removal of ferrous metals and plastics as well as deriving an efficient particle or piece size to permit an efficient carrying out of later stages involving moisture addition as well as maceration.

The output of this primary comminution stage, now referred to as a composite segregative and size limited material, is passed through the above-noted separation or classification stages. These stages may be developed to recover valuable materials such as ferrous and non-ferrous metals as well as glass and paper. Material from the recycle separation functions exits as a digestible-classified, size optimized material. This material is moved into a moisture and material consistency optimization function within which a moisture content analysis of the material is made following which it is introduced to a retention and agitation stage along with that quantity of moisture required for optimized subsequent maceration and digestion. This retention and agitation stage is provided, preferably through the utilization of a pug mill to assure a thorough absorption by the size optimized material of the added moisture.

From the retention and agitation stage, the moisture and size optimized material is introduced to a macerator stage which serves to convert this material to a pulp-characterized moisture-optimized material ideally suited for aerobic thermophilic phase digestion. The macerator stage preferably and uniquely is provided as a cage mill which, when utilized with the moisture and size optimized material, provides an ideal pulpous output of the correct moisture content to permit aerobic digestion functions to be carried out in the most efficient and economical manner.

A characterizing feature of the invention resides in the above-noted provision of an optimized moisture content for the digestible-classified, size-optimized material within the treating process at a relatively early stage. By establishing this optimum moisture at an early stage through retention and agitation within a pug mill type device, the next succeeding pulp developing requirement is carried out in a much more efficient and economical manner. For instance, syneresis phenomena normally encountered by the addition of moisture required as an adjunct to a conventional second grinding stage procedures are essentially eliminated with the technique of the instant invention. The final particle formation of pulping stage, in the present invention provided as a macerator stage, requires no excess amounts of water to effect the development of a pulp consistency from size optimized material. Not only is the disposal of such extraneous liquids or liquors an important and serious drawback to systems heretofore proposed, but there usually has been required a separate stage for removing moisture from the resultant pulp to achieve moisture content proper for aerobic digestion. These somewhat inefficient and complex stages are eliminated and the pulp-characterized moisture-optimized material developed for introduction to the digestion stage are of an improved quality.

A particular object and feature of the invention is to provide a system for composting waste material wherein the pre-treatment of starting material includes not only a primary comminution stage for developing an initial optimum size for the material as well as separation stages for the removal of non-digestible material, but additionally the utilization of steps and stages wherein a size optimized and digestible classified material is adjusted to proper moisture content at an early stage of the process through submission to retention and agitation. The output of the retention and agitation stages then is introduced as a moisture and size optimized material to a macerator stage which evolves a pulp-characterized moisture-optimized material uniquely suited for highly efficient aerobic digestion.

Another object and feature of the invention is to provide a system for treating solid waste material wherein following the pretreatment of starting material, including a comminution stage as well as a stage and step for removing ferrous metal, a segregation procedure wherein classification is provided such that heavy characterized inorganic material is removed and futher segregation is provided to derive aluminum and glass materials for recycling utilization. When removed by segregation, the materials are selectively introduced into a heating stage wherein any organic residues removed therewith are, in effect, eliminated.

As another feature and object, the invention provides for the separate removal of plastic characterized materials as well as paper characterized materials through a series of steps including the above-noted air classification to segregate both paper and plastic followed by the introduction of segregated materials in moistened form to aspirator stages which serve to segregate the paper from plastic. Following such segregation, the paper is dried and, accordingly, made available for recycling.

Other objects of the invention will, in part, be obvious and will, in part, appear hereinafter. The invention, accordingly, comprises the system possessing the construction, steps and procedures, combination of elements and arrangement of parts which are exemplified in the following detailed disclosure.

For a fuller understanding of the nature and objects of the invention, reference should be had to the following detailed description taken in connection with the accompanying drawings.

BRIEF DESCRIPTION OF THE DRAWINGS

FIGS. 2A–2D, when arranged and considered as shown in FIG. 4, provide schematic and pictorial representation of a facility incorporating the system of the invention;

FIG. 7 is a sectional and more detailed view of the pugmill and cage-mill arrangement revealed generally in FIG. 2B; and FIG. 8 is a sectional view of the cage-mill arrangement shown in FIGS. 2B and 7.

DETAILED DESCRIPTION

The present invention is particularly concerned with those stages and procedures of a solid waste treatment system which serve to prepare starting materials so as to achieve highest efficiencies at the digesting stage, a stage which may be considered as essentially the last within the process. The waste product, treated according to the instant teaching, entering this final step may be designated as a pulp-characterized moisture-optimized material which is ideally receptive to bacterialogical breakdown within an aerobic thermophilic digestive phase. In the discourse to follow the principal stages of the system and steps in the process which achieve this desired end result are identified. Additionally, desirable supplimentary stages which may be incorporated within the system are detailed. To facilitate the description, a block flow logic diagram is provided in conjunction with FIGS. 1A and 1B to reveal the process aspect of the invention, as related to the stages and their components, particularly, as such functions may be varied or expanded to meet designated facility requirements.

Figure 1A:
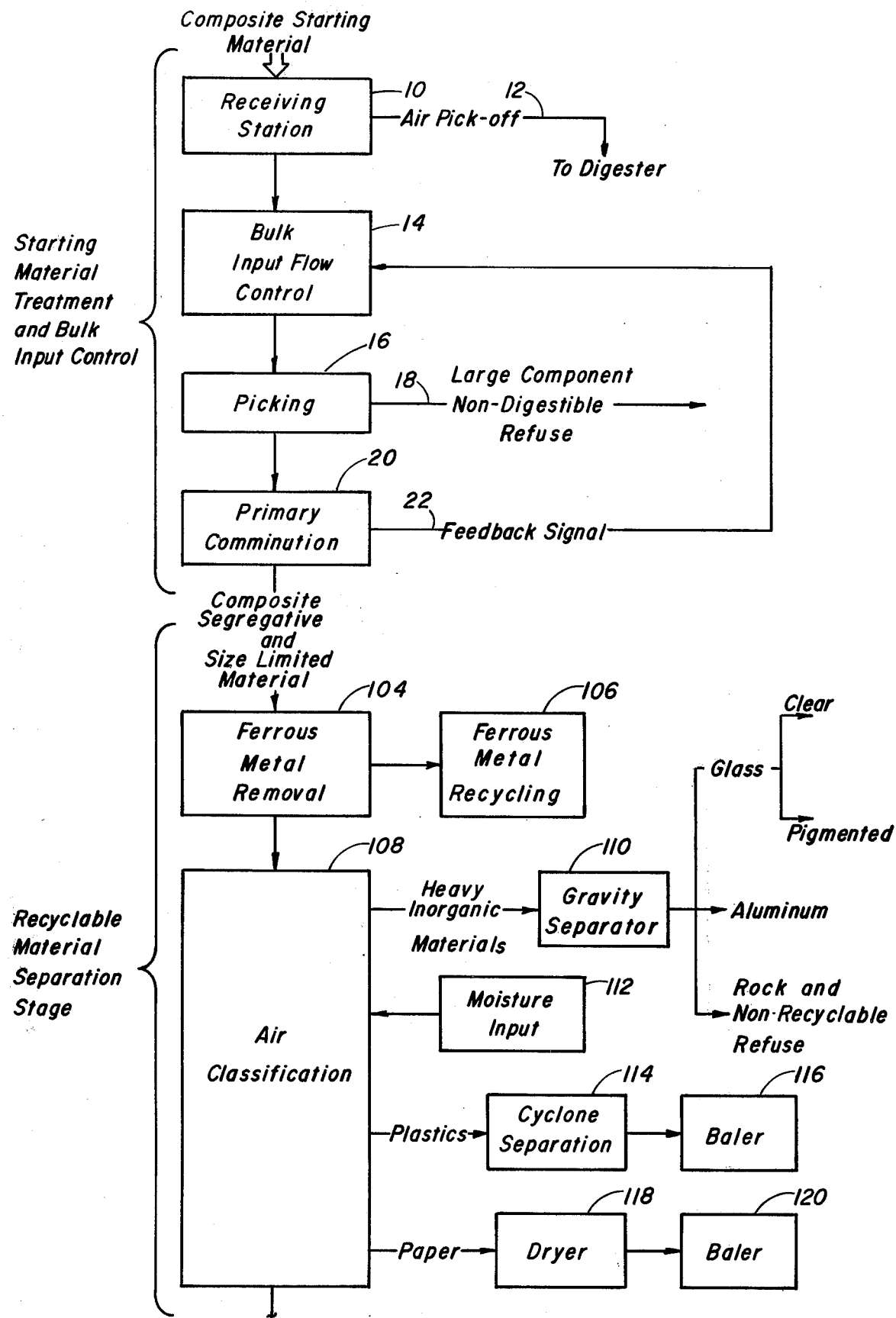
FIGS. 1A and 1B represent a block logic flow-type diagram showing steps and components of the system of the invention.

Looking to FIG. 1A, the initial steps and stages of the invention are labeled as having the function of "Starting Material Treatment and Bulk Input Control". As is revealed at block 10, solid waste material, or composite starting material, is introduced to a Receiving Station, in the usual random fashion by municipal and commercial collection agencies, where it is retained for a short interval, for instance 24 hours as a general average. The receiving station serves both the obvious purpose of providing a point collection as well as the purpose of contributing to the provision of a desirable continuous type flow of waste material into the treating system. The receiving station preferably is covered in somewhat general fashion, inasmuch as those materials which are collected may exhibit an unpleasant odorous character due to characteristic lower temperature development of fungus as well as anaerobic, for instance, mesophilic phase bacterial activity. A pick-off of the atmospheric air within the environment of station 10 is represented by line 12 and labeled as leading to a digestor. From Receiving Station 10, the material is moved in a manner providing a bulk input flow control to the system, as represented by block 14, following which it is subjected to an initial "Picking" operation, as represented at block 16, wherein, as shown by line 18, large component, non-digestible refuse is removed. Such refuse may include such elements as rejected vehicular tires and relatively large metallic objects, i.e., discarded appliances and the like. Following the Picking stage of the process at 16, the starting material is introduced to a Primary Comminution stage represented by block 20. A feedback signal line 22 extends from Comminution Stage 20 to bulk input flow control function 14 to avoid overloading the system at this point in the process.

Looking additionally to FIG. 2A, the process stages and functions thus far described are pictorially represented. Here, the receiving station is shown to comprise one or a series of live bottom receiving hoppers 26 into which refuse or starting material is dumped or deposited. Generally, these hoppers are formed having canted or sloping side surfaces such that the storing material is urged by gravity to migrate to the lowermost surface thereof, which is present as an apron feeder 28 extending between drive rolls 30 and 32. Generally, such apron feeders consist of two strands of roller chain between which are bolted overlapping double beaded steel pans provided with steel ends, thus forming a continuous moving trough. As is apparent, rotation of the rolls 30 and 32 provides for a progressive movement of refuse along the bottom portion of the hoppers to commence an initial bulk movement of material into the system. As the material reaches roll 32 of feeder 28 it drops upon the input end of another apron feeder 46 extending between rolls 48 and 50. Thus configured, feeder 46 elevates the starting material from hopper 26.

While an initial or rough into flow control is achieved through the rate of operation of feeders 28 and 46, a refinement over such bulk control is provided by a level regulating feed device represented generally at 52. Device 52 includes a conventional carrier web or belt 54 suspended between drive roll 56 and roll 58. Roll 56 is axially fixed in space, while roll 58 is mounted for movement about the pivot defined by the axis of roll 56. In this regard, a common screw-type elevating device, represented generally at 60, is provided which is coupled with the supporting axle of roll 58 and which is manually or automatically actuable to move the level of roll 58 in an arcuate or generally vertical direction. Note that roll 58 is positioned with respect to the material carrying side of the belt of conveyor 46. Accordingly, should the bulk material traveling upon the upward side of conveyor 46 exceed a level predetermined by the adjustment of elevating device 60, the web 54 of device 52 will remove such material exceeding that height and return it to the general environment of hopper 26. For this purpose, the belt 54 of carrier 52 is shown to extend rearwardly over the upper portion of hopper 26.

As the material moves upwardly and reaches roll 50 of feeder 46, it drops upon the entrance side of a vibrating feeder and screener 34. Feeder and screener 34 is configured incorporating a perforated plate, shown schematically at 36, an exit side 38 and a gravity feed output port 40. The feeder and screener 34 is mounted so as to slope downwardly from its input side and for vibration from an eccentric arrangement 39. Accordingly, upon the vibration of the device and, in turn, of perforated plate 36, the bulk material deposited thereupon will be agitated at a predetermined frequency and as a consequence, move down the inclined plane defined by plate 36 to effect a segregation of grit and loose sand which will exit through output 40 to fall upon a conveyor 42 for land fill disposal. The thus initially treated remaining material will fall from exit side 38 of feeder and screener 34 to be collected by an endless belt or conveyor represented generally at 76.

As alluded to earlier, station 10 preferably is enclosed to confine the general atmosphere surrounding the receiving hoppers 26. Such an enclosure or building is represented somewhat generally at 66 and is shown to include a plurality of ports or doors 68 providing access for trucks delivering bulk material. Additionally, the building 66 incorporates an air removal duct, as is represented generally at 70. Duct 70 will be seen to provide a vacuum outgasing function and the air evacuated therethrough is, itself, processed within the digestive function of the system to eliminate any objectionable odors which otherwise might be released to the general environment surrounding the facility.

As an example of the scale involved in the design of the hoppers and conveyors heretofore described, the total refuse estimated from a population of 500,000 served by the treatment facility generally would utilize four receiving hoppers 26 having 200 ton capacities, while the vibrating feeder and screeners would be selected, for instance, to remove approximately 10 tons per day of grit and loose sand. Apron feeders, as at 28, for each of the receiving hoppers 26 would be designed to move solid waste at a rate of about 50 tons per hour.

Bulk input flow control being asserted and screening having been carried out, the material exiting from side 38 of screener 34 onto an endless belt, designated generally at 76. Serving to expose the refuse deposited thereon for the earlier denoted picking function described in conjunction with block 16, the picking belt 76 extends between drive rolls 78 and 80 and is supported in a generally horizontal orientation. As large component type, non-digestible refuse is identified on the belt, it is removed manually or by appropriate picking devices, placed upon conveyor 42 and ultimately disposed of in land fill or other suitable large bulk disposal facilities. If desired, some smaller particle size ferrous metal refuse may be removed at this stage of treatment by providing a magnetic type head pulley at 80. In conventional fashion, the magnetized head at 80 would attract such ferrous metal particles just long enough to deflect their fall along a vector direction displaced from that exhibited by the non-ferrous metal materials exiting from belt 76. However, in the arrangement now presented, such metal removal preferably is provided at a later stage in the process.

Upon undergoing picking treatment at belt 76, bulk waste material is deposited from over roll 80 into a primary comminution stage, represented by a crusher 86. Comminuter function 86 serves to reduce the maximum average particle size of the bulk material passing therethrough. Preferably, this size will provide a maximum average effective diameter for the particles of about 6 inches. A reject port for crusher 86 is represented at 87. The term "effective diameter" is considered to be that diameter of a hypothetical circular section of a particle having a surface area the same as that sectional area of a corresponding normally encountered particle of irregular shape. This maximum average particle size is selected both to facilitate later classification of materials as well as to establish that particle size within which moisture levels requisite optimum for both pulp formation and digestion may be developed, as discussed in detail later herein. Devices as at 86 generally operate utilizing horizontally rotating crushing components which, in addition to developing the noted bulk particle size also reject materials of excessive size and density. Such rejected materials may, for instance, be removed to a land fill as by conveyor 42. Typical of crushers utilized as at 86 are those identified under the designation "Eidal"-type Grinder, marketed by The Carborundum Co. of Hagerstown, Maryland.

The earlier noted feedback signal, described in conjunction with FIG. 1A at line 22, may be derived through typical control techniques i.e. current load monitors and the like associated with the drive components of device 86. By monitoring such loads, comparing the resulting signals with a desired control level and deriving an output signal, an automatic control input can be asserted at elevating device 60 to adjust bulk flow input to the remainder of the processing system. Alternatively, feeder 28 and/or conveyor 56, feeder 34 and belt 76 may be temporarily halted under overload conditions.

Figure 2B:
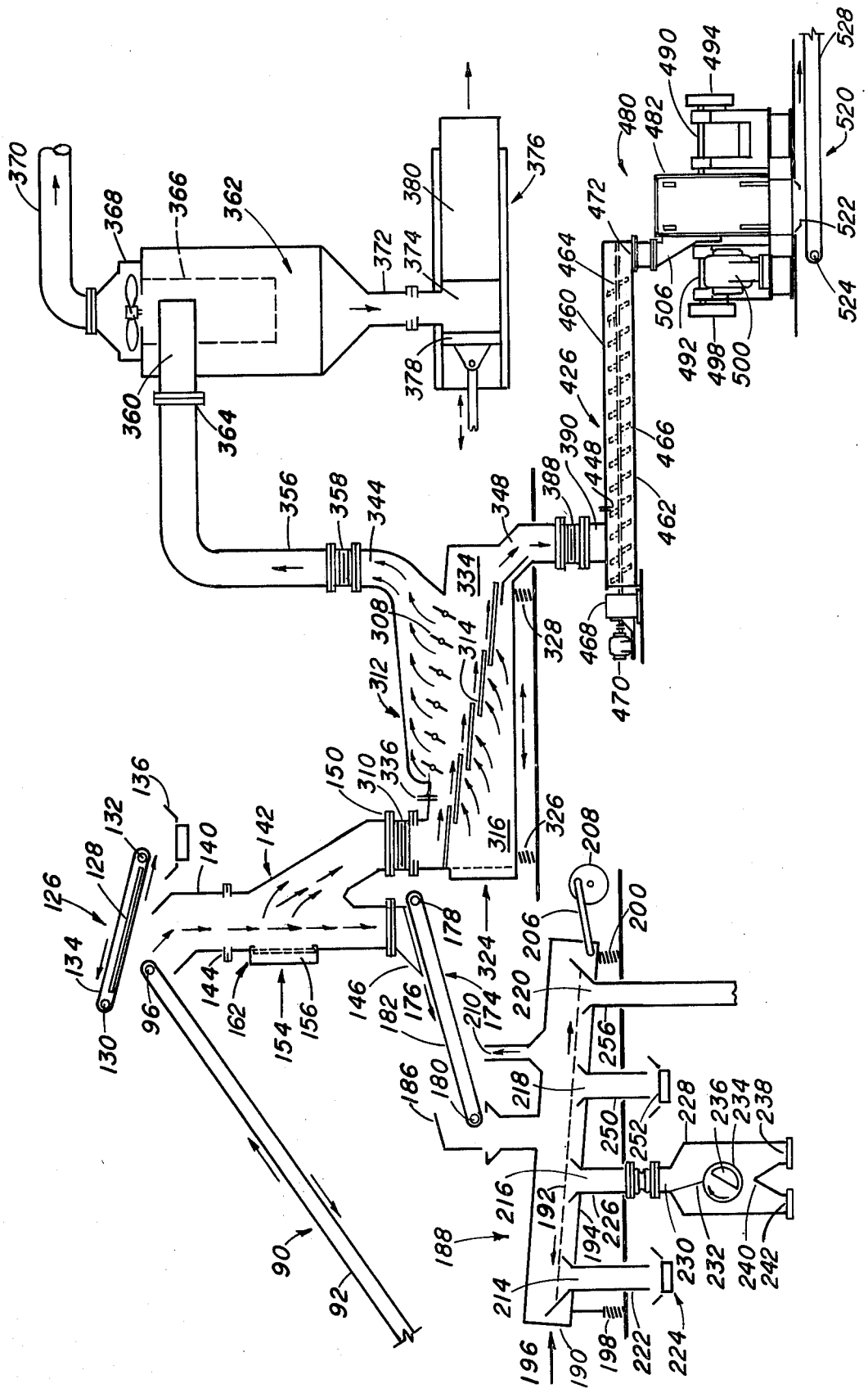

Looking additionally to FIG. 2B, material exiting from primary comminution stage 86 now may be referred to as a "Composite Segregative and Size Limited Material" and is dropped by gravity upon the lowermost side of a conveyer represented generally at 90. Formed as a continuous belt 92 extending between terminally disposed drive and idler rolls, respectively shown at 94 and 96, the noted Composite Segregative and Size Limited Material is elevated for entrance to the next processing stage of the system. To facilitate deposition from grinder structure 86, a small hopper 98 is provided at the entrance to conveyer 90. At the uppermost roll 96 of conveyer 90, the Composite Segregative and Size Limited Material encounters the first of a series of Recyclable Material Separation Stages, which are generally outlined under that label in FIG. 1A. Looking to the latter figure, it may be observed that Ferrous Metal Removal is carried out within the initial stage of treating the size limited material, as revealed at block 104. Such ferrous material is recoverable and of value in recycling procedures. Accordingly, the disposition thereof is represented at 106. Following this initial ferrous metal removal, the size limited material is directed through a series of air classification operations which, according to design option, may be provided for removing a corresponding series of materials. These operations are functionally associated in that an air classification technique is utilized to effect select material removal basically in dependence upon the known densities exhibited by their constituent makeup. The air classification function is represented generally by block 108, which reveals that heavy inorganic materials initially are removed. These heavy inorganic materials will include, for instance, glass, aluminum and rock and non-recyclable refuse which will have been carried through the process to that point. Generally, a Gravity Separation stage or stages is provided to further segregate the inorganic materials, as is revealed by block 110. Shown extending from block 110, as being segregated by type gravity device, are glass, aluminum and rock. Where desired, the glass segregated output further may be classified to derive a collection of clear or flint glass as well as pigmented glass.

Following the removal of heavy inorganics, as revealed at block 112, moisture may be added to the materials remaining within the air classification stages for the purpose of segregating plastics and paper. The amount of moisture added is only that required to contribute sufficient density to the paper material as to render it identifiable over conventional plastics for purposes of air classification. It is important to note that the amount or content of water absorbed by the material particles at this stage of the process preferably is less than and not more than equal to that content of water considered optimum for final digestion. Accordingly, following the addition of moisture as at block 112, plastics, not absorbing the moisture, are removed from classification function 108 to be directed to a Cyclone Separator stage, as revealed at block 114, from which it is directed to a baler function 116 for disposition in accordance with the desires of the operator. Similarly, paper may be removed from the classification function 108 following plastic removal and directed to a drier, as represented at block 118, to remove the earlier induced moisture and provide sterilization and thence directed to a baling function as shown at block 120. The percentage of paper removed during air classification may be selectively variable in dependence upon the sophistication of the air classification function designed for a particular installation. Inasmuch as paper, in and of itself, is a digestible material, where its value as recycled and baled is sufficiently high, a correspondingly high percentage removal is economically justified. However, as labeled in FIG. 1B, the material derived from function 108 may be categorized as a "Digestible-Classified, Size-Limited Material".

Returning to FIG. 2B, as conveyer 90 elevates the composite segregative and size limited material to the vicinity of its terminus at roll 96, it encounters the region of magnetic field influence asserted from a ferrous metal removal stage, revealed generally at 126. Stage 126 is shown to comprise a relatively large electromagnet, represented by block 128, which is supported within a belt conveyer including terminal drive rolls 130 and 132 and conveyer belt 134. Magnet 128 is configured and positioned to develop its magnetic field in close adjacency and continuously along the lower disposed surface of belt 134. Extending beneath belt 134 in the vicinity of row 132 is a conveyer, schematically represented at 136. Accordingly, as materials carried along belt 92 move into the vicinity or region of magnetic influence of magnet 128, they are attracted to the externally exposed side of belt 134 by virtue of the magnetic influence and are carried thereby under such influence until the belt encounters roll 132. This position upon the belt being without the magnetic influence magnet 128, the material falls by gravity to conveyer 136, whereupon it is conveyed to a storage region for ultimate disposition as a valuable product of the system.

Ferrous metal particles having been removed, the remaining size limited particulate material falls into the entrance hopper 140 of an air classifying aspirator 142. Aspirator 142 serves to segregate heavy inorganic particles, such materials, as described above, including glass, aluminum, rock and nonrecyclable refuse which may have been carried to this stage in the treatment system. As is revealed in more detail in FIG. 6, aspirator 142 includes an entrance or connective collar 144 coupling its uppermost input with hopper 140. Collar 144 addresses a generally downwardly disposed chamber which is bifurcate at its lowermost portion to define two channels intended for a combined gravitational and dynamic separation of materials. One such channel provides a more or less direct drop, or purely gravitational vector orientation, exiting at an outlet 146. The other chamber, extending from the common entrance area of the aspirator as revealed generally at 148, extends along a somewhat deflected vector path to a corresponding outlet, represented at flange 150. Formed outwardly from common area 148 and extending downwardly toward outlet 146 along one side of aspirator 142 is a rectangularly shaped plenum 156 which, in turn, is connected through ducting as at 158 including flow control vane 152 to a source of pressurized air as may be generated, for instance from a conventional centrifugal fan. This input of air through a duct as at 158 is revealed, in the interest of clarity, at arrow 154 in FIGS. 2B and 6. Formed inwardly along the open face of plenum 156 is a grate-type baffle, revealed generally at 162. Extending between channel-type frame members 164 and 166, baffle 162 is formed of two lattice-type members 168 and 170 which may be manipulated with respect to each other to define an array of openings for dispensing air in uniform fashion within the chamber of aspirator 142 in accordance with the desires of the operator. With the structural arrangement thus provided, particulate materials entering aspirator 142 through collar 144 will fall under gravity in accordance with a path determined by their discrete densities. In particular, heavy inorganic materials such as glass, aluminum or rock and nonrecyclable refuse will follow a purely gravitational vector generally leading to their exit through outlet 146, while lighter particles, representing plastics and biodegradeable materials, including paper will be deflected by the air stream generated from plenum 156 and baffle 162 to follow a deflection vector causing their exit through the opening defined at flange 150.

As heavy inorganic materials exit through port or opening 146, they fall upon a conveyer, shown generally at 174. Conveyer 174 is represented more fully in FIG. 2B in altered orientation in the interest of drawing clarity and is there shown to include a hopper portion 176, as well as drive rolls 178 and 180, provided at the termini of the conveyer and supporting an endless belt 182. The conveyer 174 serves to move the heavy inorganic particulate matter into the input hopper 186 of a fluidized-bed separator revealed generally at 188. Also referred to as "gravity separators" or "air-tables", separators as at 188 are known in the art, for instance, being marketed by Triple/S Dynamics Corporation, Dallas, Texas, and provide particle separation by a combined action of gravity, fluidized air, stratification of the material or particles and vibration. As is revealed schematically in FIG. 2B, separator 188 comprises a chamber 190, supporting hopper 186 and covering a perforate deck 192 over which the material particles are deposited from hopper 186. A plenum 194 is structured beneath deck 192 to provide a low pressure fluidized air source impinging and passing through the openings thereof. The air source for plenum 194 is represented schematically by an arrow 196. Deck 192 further is suspended for vibration as well as in a two directional slope orientation by a spring arrangement depicted somewhat schematically in the drawing at 198 and 200. Vibration may be imparted to the assembly 188 by an eccentric connection with a rotary drive, as revealed schematically by a rod 206, one end of which is coupled with plenum 194 and the other of which is connected in eccentric fashion to a rotational drive output represented at 208. Air is removed from the chamber or hood 190 through a duct 210.

Material is selectively removed from the separator 188 at a series of hopper-like devices 214-220, disposed in serial fashion along the lower side of deck 192. Exemplary of the arrangement described in conjunction with air classification function 108 in FIG. 1A, separator 188 operates to remove rock materials and the like through hopper 214, located at the uppermost level of deck 192. In this regard, a conduit 222, leading from hopper 214, deposits the rock upon a conveyer or the like, shown generally at 224, which removes such materials to land fill, for instance by deposition upon the earlier described conveyer 42. The next succeeding hopper 216, positioned along the side of deck 192, serves to collect glass particles, which are directed through a flexible conduit 226 to the entrance of a glass classification device 228. Device 228 is schematically revealed as comprising an input port 230 through which glass materials are directed. These materials are diverted by a vane 232 so as to fall upon a rotating drum 234 at an off-center location. Within the drum is disposed in stationary fashion an electro-magnet 236 serving to provide a high intensity magnetic flux along half of its cylindrical area or extent. As the drum rotates about the magnet 236, clear or flint-type glass immune to magnetic fields, falls along purely gravitational vectors to exit through one outlet 238 of a bifurcate exit. Note that a triangular shaped vane portion 240 is positioned beneath the center line of drum 234 which serves as a deflector for the glass particles. Those glass particles which are pigmented, conventionally by the incorporation therewithin of ferrous compounds and the like, are slightly deflected by the magnetic field extant at the surface of drum 234 and, in consequence, are sufficiently deflected to fall through an exit or outlet 242.

Hopper 218 may be so positioned along deck 192 as to collect non-recyclable refuse having a density other than that of rock and the like. For instance, particles of leather and rubber will be collected at hopper 218 to exit through conduit 250. Thereupon, these materials are carried away by a conveyer 252 to land fill facilities or the like. As in the case of conveyer 224, conveyer 252 may communicate in material exchange fashion with conveyer 242.

Figure 2C:
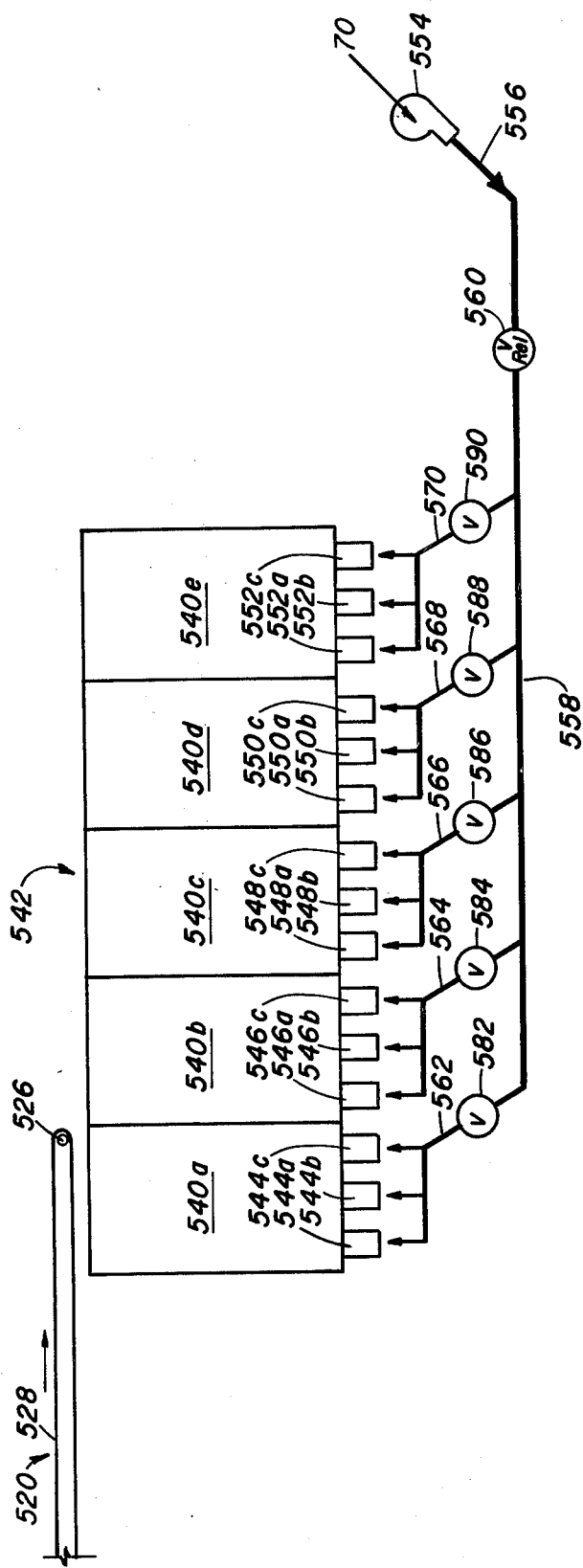
Figure 2D:
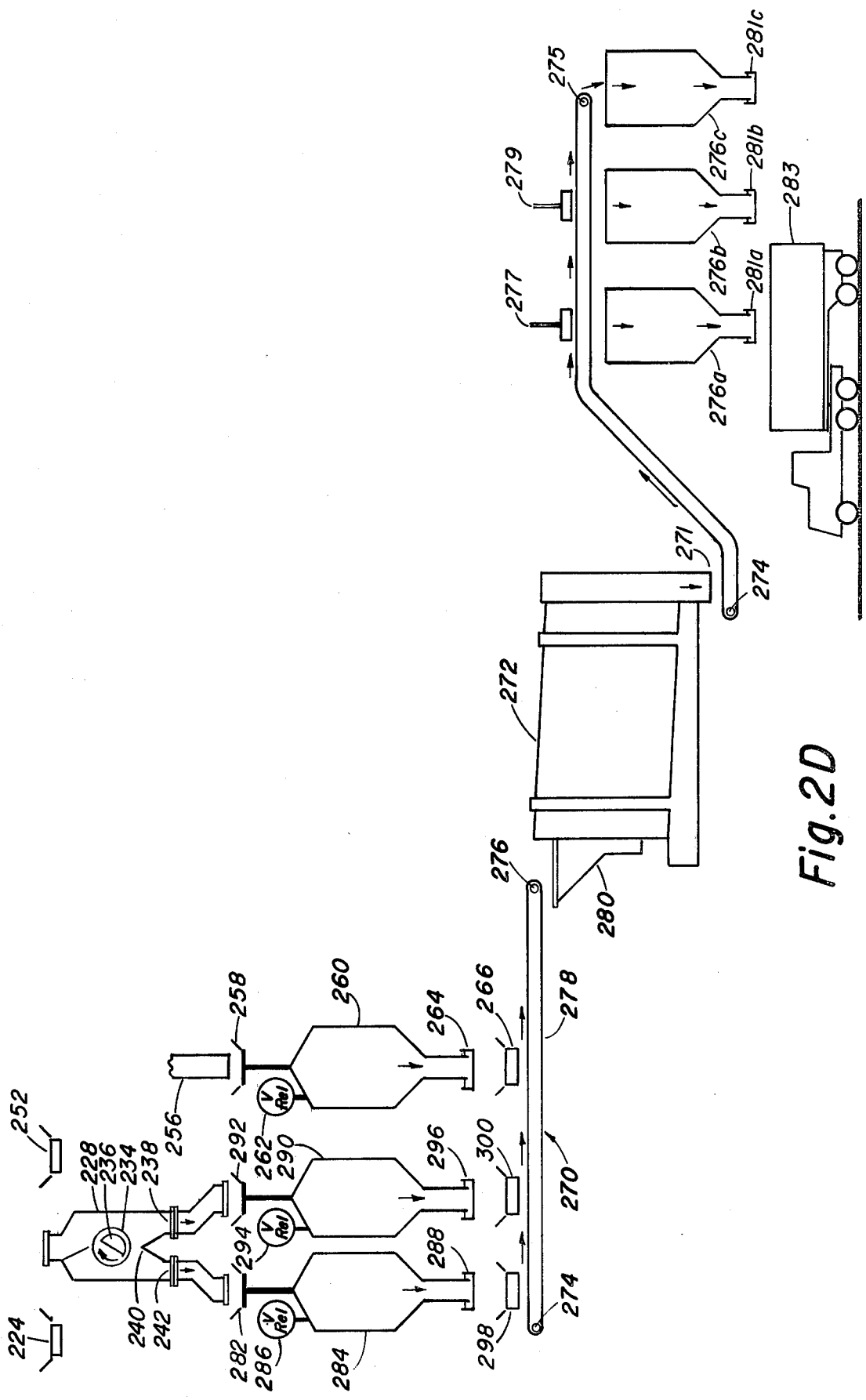

Looking additionally to FIG. 2D, the lowermost hopper 220 affixed to deck 192 is positioned to receive aluminum particles which are directed therefrom through flexible conduit 256 to the input hopper 258 of a storage tank 260. Incorporating a typical air relief valve 262 and a material release gate 264, tank 260 accumulates aluminum products over a specified interval of time, whereupon gate 264 is opened to permit the accumulated products to fall upon and be conveyed by a vibratory feeder 266 for metered flow onto a carrier 270, which, in turn, leads to a rotating drum drying and sterilizing device 272. Carrier 270 is shown to include drive rolls 274 and 276 which contribute to the support of an endless belt 278. Entrance of the material to drum dryer 272 is facilitated by a hopper arrangement revealed schematically at 280. In similar fashion, the pigmented glass outlet 242 of device 228 is collected through the hopper 282 of a storage tank 284. Formed in similar fashion as tank 260, tank 284 includes an air relief valve 286 as well as a release gate 288. Adjoining tank 284 is a similar tank 290, the hopper 292 of which is positioned beneath outlet 238 to provide for the reception of clear glass particles. Tank 290 is vented at 294 and provided a release gate at 296 in similar fashion to the arrangement provided in connection with tank 260. Gates 288 and 296 of tanks 284 and 290 are positioned over respective vibratory feeders 298 and 300, in turn, extending to conveyer 270 such that the contents contained therewithin may selectively be deposited upon the conveyer for delivery to drier 272 at times deemed appropriate by the operator of the system. Without the vibratory feeder arrangements, loadings transferred by conveyer 270 to drum 272 may be excessive, i.e., these feeders serve to meter the flow to conveyer 270 to provide a regulated input to drier 272.

From drier 272, the materials are collected for recycling disposition. From outlet 271 of drier 272 those materials passing through the drier are deposited upon a conveyer as represented generally at 273. Conveyer 273 may, for instance, be of the endless belt variety including terminal roll portions as at 274 and 275. The material so deposited upon conveyer 273 is moved upwardly for conveying it to a selected one of dispensing bins 276a-276c. This selection is carried out, for instance by positioning the belt of the conveyer with respect to a diverting plow, as at 277 or 279. By so altering the conveyer belt, for instance, plow 279 will divert material into bin 276b, or flow 277 will divert material into bin 276a. Gates as at 281a-281c associated with bins 276a-276c may be selectively released to convey the materials stored therein within a mode of conveyance, for instance the truck vehicle represented at 283. As noted hereinabove, the provision of the separator, device 188 as well as the storage, glass classification and drying arrangements are optional to the design of any given facility. Where the characteristics of the disposed refuse and the value of the reclaimed glass and aluminum materials are appropriate to the initial capitalization required for such facilities, they generally are incorporated within the overall system. However, where this is not the case the heavy organic material output issuing from outlet 146 of aspirator 142 are committed to conventional land-fill for final disposal.

Figure 6:
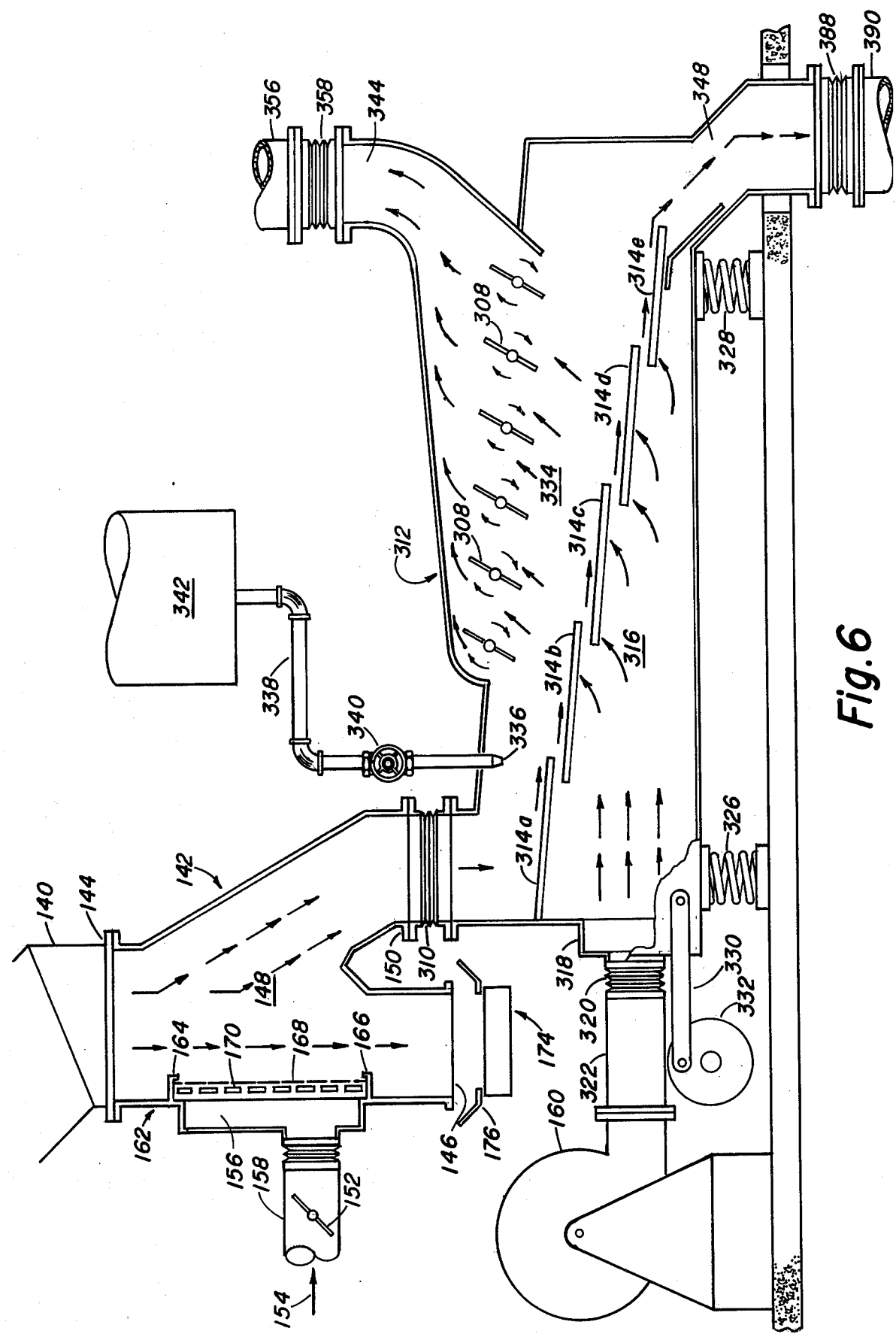
FIG. 6 is a sectional and more detailed view of the air classification arrangement of FIGS. 2B and 3A.

Looking to FIGS. 2B and 6, those material particles deflected to exit from aspirator 142 through outlet flange 150 pass through a flexible connection 310 to an elutriating type air classifier, depicted generally at 312. Classifier 312 incorporates a series of perforate grates arranged in descending step fashion, as at 314a-314e, (referred to hereinafter and shown in FIG. 2B as grates 314). Grates 314 are positioned within a housing, the portion formed beneath the grates defining a plenum chamber 316 having an air input collar 318 which is connected through a flexible connector 320 to an air input duct extending from a fan 160. In the interest of clarity, this air input is represented generally in FIG. 2B by an arrow designated 324. The entire classifier structure 312 is suspended, for instance by springs depicted at 326 and 328, to permit its vibration. This vibratory input is schematically represented by a bar 330 connected between the housing of the classifier 312 and eccentrically to a rotational drive 332. As is apparent, this vibrator arrangement will be observed to account for the flexible couplings provided at 310 and 320. Material from aspirator 142 is deposited within an upwardly disposed chamber, designated generally at 334 and, as it enters this chamber, is wetted by water passing through nozzles as at 336, (FIG. 6) positioned at an entrance area for the material. Nozzles as at 336 are coupled through a conduit 338 incorporating a value 340 and extending to a water supply generally designated at 342. Accordingly, the paper and other materials entering chamber 334 are dampened and their density is elevated such that under the above-noted vibration, the dampened paper particles will migrate along grates 314 to an exit port 348, while lighter plastic materials will be blown by the air-flow through grates 314 to be driven through serially dispensed louvers 312 and thence through outlet 344.

The lighter particulate materials which are blown upwardly through vanes 308 and outlet 344, enter and pass through a conduit 356. Conduit 356 is coupled to outlet 344 through a flexible connection 358 which serves to accommodate for the vibratory action of classifier 312. Looking in particular to FIG. 2B, conduit 356 is seen to extend to the tangentially disposed input port assembly 360 of a cyclone separator 362. Connection between port assembly 360 and conduit 356 is provided at mutually adjoined flanges shown at 364. Having a generally cylindrical shape with a funnel-shaped lower portion, separator 362 incorporates a centrally disposed cylindrical plug 366 as well as an exhaust fan 368 mounted at its upward surface. From exhaust fan 368, a conduit 370 extends, for instance, through an electrostatic precipitator or the like (not shown) for final disposal of exhaust air to the atmosphere. The lowermost portion of separator 362 extends to a relatively large diameter conduit 372 which, in turn, communicates with the collection chamber 374 of a conventional baler 376. Baler 376 includes a hydraulicly driven piston, represented schematically at 378, and a baling or wrapping chamber 380. In operation, plastic particles are blown through entrance port 360, whereupon they assume a vortex-type activity about the periphery of the body of separator 362. As their rotational velocity decreases the particles tend to move toward the center of the vortex to ultimately drop through conduit 372 for baling and disposition.

That material which gravitates along grates 314 and falls through exit port 348 of separator 312 is directed through a flexible coupling and conduit 390 into a next succeeding function of the treatment facility.

Figure 1B:
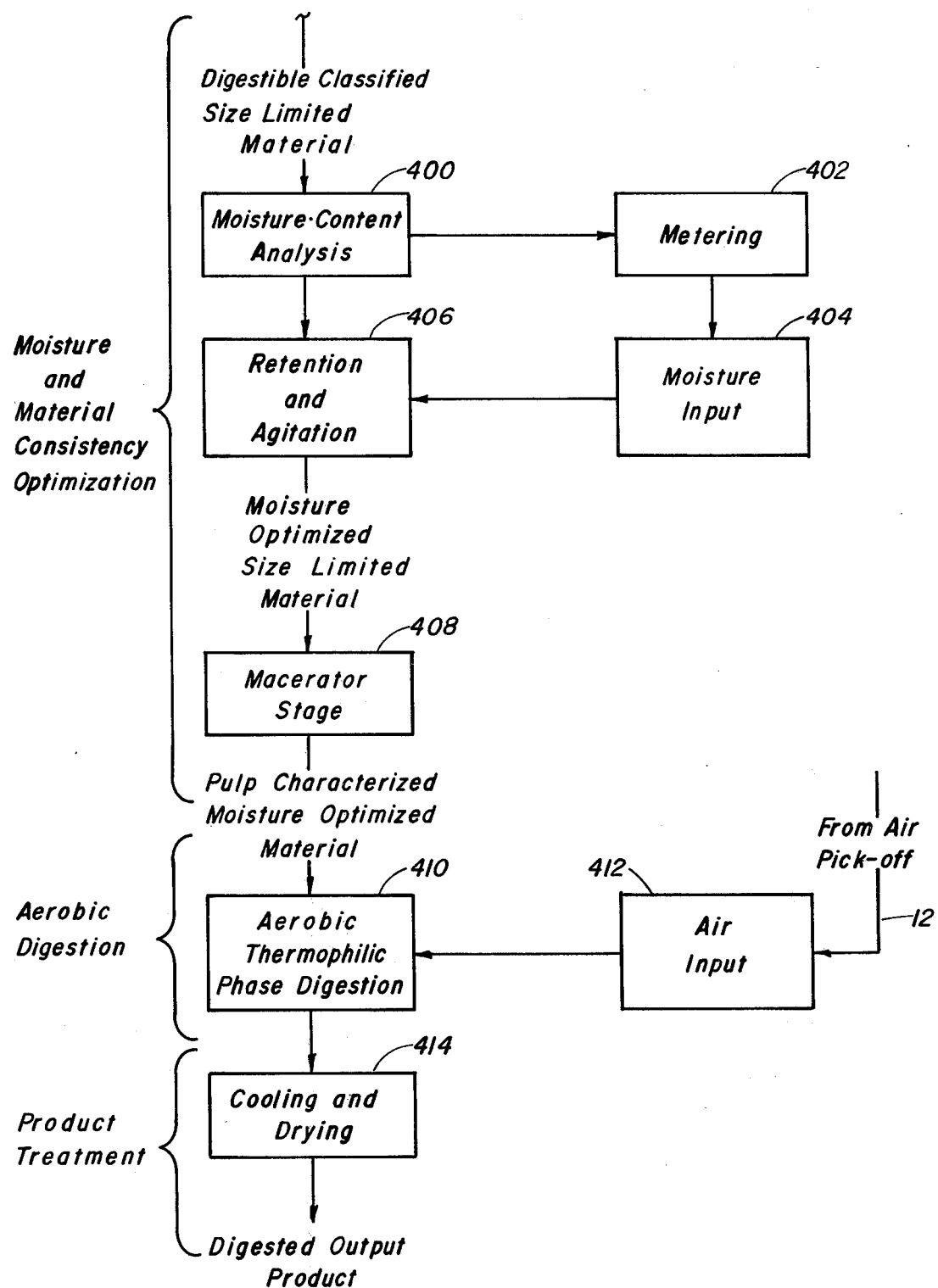

Looking to FIG. 1B, such material is now identified as a Digestible-Classified, Size-Limited Material and is labeled as entering a Moisture and Material Consistency Optimization function. Note that the material is of an optimum size for the above-noted classification procedures and also for absorbing a predetermined quantity of moisture which now is selected to achieve both optimized pulping as well as optimized aerobic thermophilic phase digestion. Until the present point in the system, the moisture content of this material is purposely retained at a level lower than that required for the above treatment. Accordingly, to achieve proper moisture content for the Digestible-Classified, Size- Limited Material, an initial Moisture Content analysis is made thereof, as represented at block 400 in FIG. 1B. This analysis, which may be carried out automatically, derives, for instance, a corresponding signal representative of the amount of moisture which must be added to the material to achieve the noted desirable moisture level. By inserting such signal into a conventional comparison network and providing a corresponding error-type mechanical readout, a water metering function is readily derived as represented at block 402. Metering block 402 controls the moisture input to the material, as represented at block 404. With the addition of moisture, the Digestible-Classified, Size-Limited Material is retained for a select interval while being agitated so that the optimized moisture content is achieved with assurance that such moisture is fully absorbed throughout all portions of all particles. It is the intent of the invention that no excess liquid be generated beyond that required for thermophilic phase aerobic digestion. The important retention and agitation step of the process is represented at block 406 and may be carried out in a pug mill which incorporates water input components.

The material exiting from the retention and agitation stage 406 may be categorized as a Moisture Optimized, Size Limited Material and is directed to the next succeeding procedure or stage identified at block 408 as a Macerator Stage. At stage 408 the moisture and size optimised material is reduced to a pulpous-like consistency suited for optimised biodegradation within the aerobic digestion function of the system. Preferably, a cage mill is utilized for this procedure, the cage mill importantly requiring no excess moisture or the like to achieve the pulp defining activity required. As labeled in FIG. 1B, the material exiting from stage 408 may be defined by Pulp Characterized, Moisture Optimized Material.

This material then is introduced to the aerobic digestion function of the system as is labeled and represented at block 410. Aerobic thermophilic phase digestion of the material is carried out under the influence of a pressurized air input represented at block 412. The amount of air introduced is that required to accommodate the Biochemical Oxygen Demand (BOD) of the material to carry out appropriate digestion. Note that this air input utilizes supplementary air picked or removed from receiving station 10 which, under anaerobic conditions which may obtain at such location, can be oderiferous due to the putrescibles generated at that early stage of refuse collection. As the digestion process is concluded at stage 410, the material exiting therefrom is cooled and dried as at block 414 and a digested output product is available from this final Product Treatment function of the system and process.

Returning to FIG. 2B and referring additionally to FIGS. 7 and 8, the above-described retention and agitation stages as well as macerator stage are set forth in more detail. For instance, conduit 390, carrying the noted Digestible Classified, Size Limited Material is connected to the input port 424 of a retention and agitation stage which, in accordance with the preferred embodiment of the invention, is provided as a pug mill depicted generally at 426. Pug mills, or paddle mixers are utilized in the material processing arts to accommodate requirements for mixing, stirring or blending. For instance, they are frequently used for mixing mortar, plaster or asphalt materials, or for mixing flue dust with water as well as in iron sintering and similar applications. As described in detail above, pug mill 426 serves, in the instant application, for generating an optimized moisture content within the particles introduced thereto. To carry this out, a water source, labeled as such in FIG. 7, is introduced through a metering control represented generally by block 432. This water source may be present as a conventional and relatively pure water input or, where the facility location permits, may be present as a water-born sludge. Generally, such sludge is present as a basically liquid phase carrying about ten-percent by weight solids. Metering control 432 responds to a signal, presented from along line 434, to the signal output of a moisture monitor 436. Monitor 436 is connected through line 438 to a moisture monitoring probe 440 which continually monitors the moisture content of materials passing through conduit 390 into pug mill 426. This signal is utilized by monitoring control 432 to regulate fluid input through line 442 to a valve 444. Volume control being effected at valve 444, water then passes through conduits as at 446 for dispensation through nozzles as at 448 within pug mill 426. In the interest of clarity, only nozzles 448 are shown in FIG. 2B.

Pug mill 426 comprises a generally box-shaped housing, the top and bottom sides of which are represented, respectively, at 460 and 462. Extending along the length of this housing is a centrally disposed rotatable shaft 464 carrying a plurality of serially disposed paddles as at 466. Shaft 464 is rotatably driven through a reduction gear arrangement 468 by a motor 470. Accordingly, as Digestible Classified, Size Limited Material enters mill 426 through input 424 thereof, it is progressively mixed by paddles 466 and gradually maneuvered toward an output port 472. By virtue of the mixing activity imparted from the paddles in conjunction with water input from nozzle 448, and in consequence of the period of retention established by the length of the mill, the material exiting the mill at output port 472 is optimized for moisture content and retains its size-limited characteristic. This optimization of moisture content not only is that most desired for ultimate digestion but also, is ideal for the macerating function immediately following. Pug mills are available in the market, for instance, from Link-Belt Company, Chicago, Illinois.

As noted above, the material exiting from the retention and agitation stage, categorized as a Mositure Optimized, Size Limited Material next is directed to a macerator stage. Preferably, this stage is present as a cage-mill which is uniquely selected for utilization within the instant system. Such mills require no excess moisture or the like to achieve the necessary pulp formation of the material introduced thereto. Referring additionally to FIG. 8, cage mill 480 is seen to be enclosed within a housing 482 the peripheral profile of which is of generally round configuration, being flared outwardly at its connection with a supporting base 484. Somewhat centrally disposed within the housing 482 are a series of concentric ring shaped cages as at 486a–486d. These individual cages or cage elements incorporate impact bars, certain of which are identified at 488, which rotate with their associated cage rings. In this regard, alternately disposed ones of the cage rings are driven from respective opposite sides of the mill. For instance, cage rings 486a and 486c may be driven from a drive input shaft 490, while cage rings 486b and 486d are driven in an opposite rotational sense by a drive shaft 492. Driving power is supplied to shaft 490, for instance, from a belt or similar transmitting device 494 extending to a power source, for instance a motor 496. Similarly, shaft 492 may be coupled through an appropriate power transmitting device 498 which, in turn, may be connected to a drive input as from motor 496 or from a separately disposed power input as represented at 500.

Moisture-Optimized and Size-Limited Material exiting from outlet 472 of pug mill 426 enters cage mill 480 through a hopper 506 which serves to direct this material to a generally centrally disposed input opening 508 leading to the interior of the innermost disposed cage 486a. This material impinges upon the cage impact bars 488 thereof and is hurled by centrifugal force into the path of the counter rotating next outwardly disposed bars. This multi-stage impaction provides a doubling of the asserted impact force and results in improved product breakdown with minimal mill speed and wear. Upon exiting from the outer cage as at 486d, the material falls through opening 510 in base 484. Disposed immediately beneath opening 510 for receiving the thus discharged pulpous material is a conveyer, shown generally at 520, comprising an input hopper 522, terminal end rolls 524 and 526 and belt 528.

Looking particularly to FIG. 2C, terminal roll 526 of conveyer 520 extends to deposite the Pulp Characterized Moisture Optimized Material into the first cell 540a of a multi-celled digester represented generally at 542 and incorporating a successive grouping of cells 540a–540e. Material thus deposited within cell 540a commences aerobic thermophilic phase decomposition at appropriate temperature and under proper oxygen input. In the latter regard, air under pressure is introduced into each of the cells from along the respective floors thereof through air channels respectively shown at 544a–544c through 552a–522c, hereinafter referred to as channels 544-552. Atmospheric air under pressure is delivered to cells 544-552 from high pressure centrifugal blowers, one of which is revealed schematically at 554 extending through line 556 to an air delivery manifold represented by line 558. Additionally inserted at the intake of blower 554, is the environmental air collected from building 66 of the receiving stage and moved therefrom through duct 70 (FIG. 2A). Upon passing a relief valve 560, the pressurized air is maneuvered into branch conduits 562-570, each incorporating a control valve represented, respectively, at 582-590.

During the operation of digester 542, material is progressively maneuvered from cell 540a through final cell 540e, as it undergoes progressive decomposition until reaching cell 540e, wherein final decomposition and cooling takes place. Upon removal from cell 540e, the material is stockpiled for ultimate disposition for instance, the packaging thereof for resale, use as land fill, or other further product improvement treatment. This product is referred to as a "Digested Output Product".

Figure 3A:
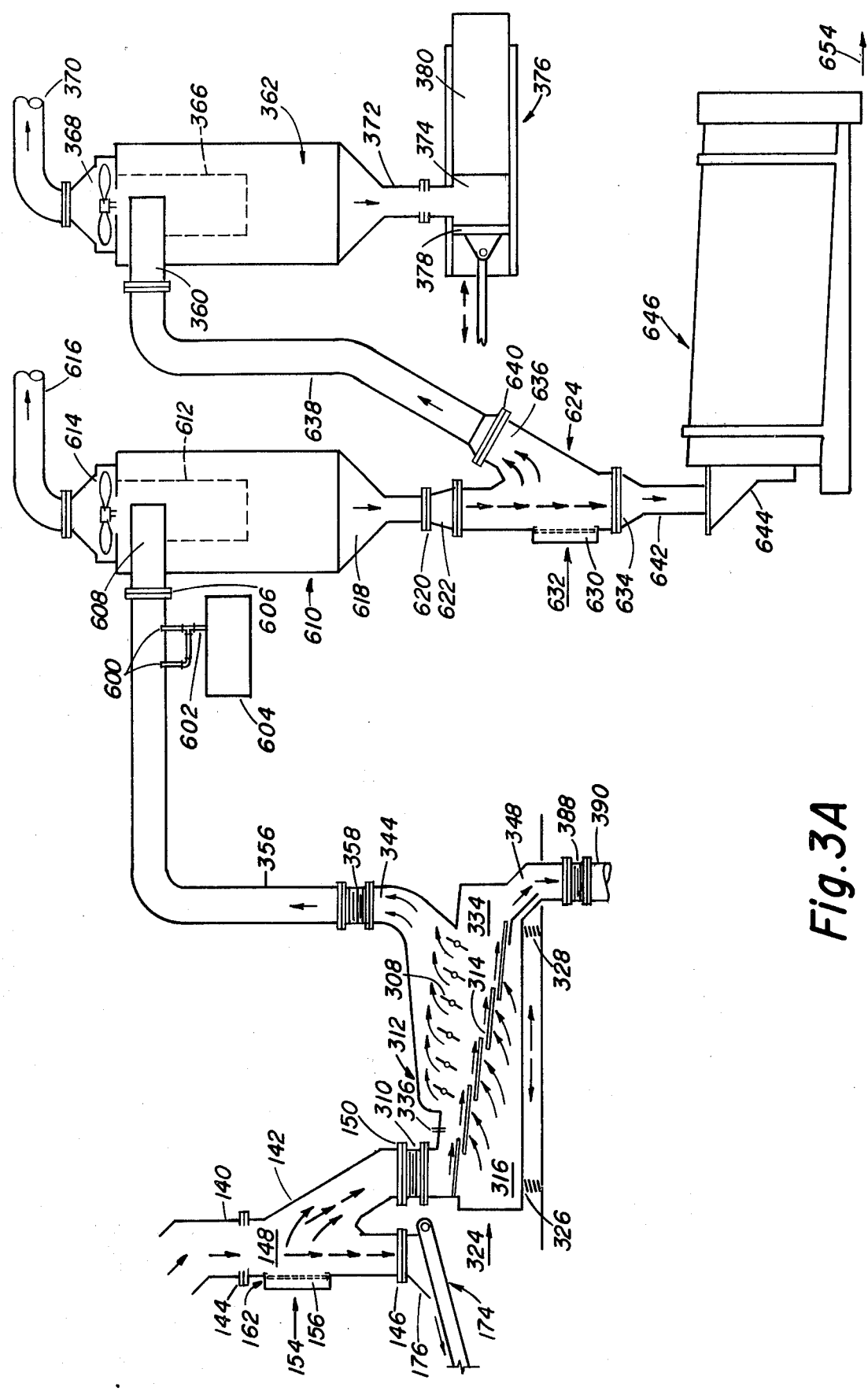
FIGS. 3A and 3B, as arranged as shown in FIG. 5, provide a schematic and pictorial representation of portions of the facility of FIGS. 2A–2D, revealing an alternative embodiment thereof.
Figures 3B, 4, 5:
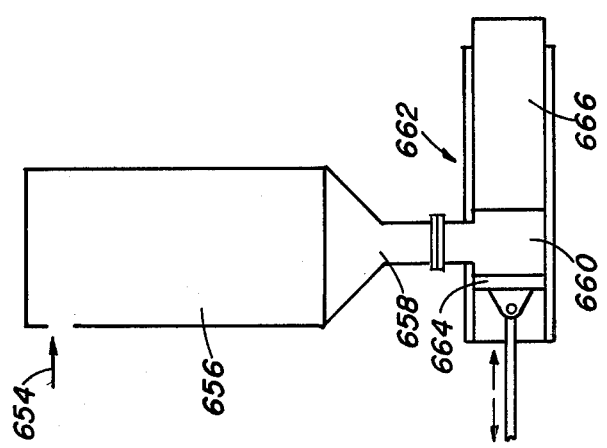
FIG. 4 is a diagram showing the arrangement for associating FIGS. 2A–2D.
FIG. 5 is a diagram showing the arrangement of FIGS. 3A and 3B.

Turning now to FIGS. 3A and 3B, an alternate association of components for utilization within the recyclable material separation stages is revealed. In the interest of clarity, where components remain common with those described in connection with FIGS. 2A–2D, identical numeration providing their identification is retained. In this embodiment, the general arrangement described in connection with the recyclable material separation stages of the earlier described figures are provided with certain alterations. For instance in the embodiment of FIG. 2B, aspirator 142 serves to receive composite segregative and size limited materials, having ferrous metal particles removed therefrom, through its entrance collar 144. Heavy inorganic materials are separated to exit from aspirator 142 through its outlet 146 to be removed by conveyer 174. Corresponding lighter materials, including paper and plastic, are diverted to pass through that channel of the aspirator, having an outlet at flange 150, to enter elutriating type air classifier 312. The heavier digestible materials migrate along grates 314 to exit into conduit 390. Under the influence of forced air, as represented schematically at arrow 324, the lighter particles of the material, including paper and plastics, are blown through vanes or louvers 308 to exit from classifier 312 through its outlet 344 and enter conduit 356. In the instant embodiment, as these combined particles pass along conduit 356 they encounter the spray nozzles 600 of a pressurized water input extending through conduits as at 602 from a pressurized water supply 604. Note, that no water is added to the classifier stage 312. However, the water now added may be provided in an amount not as critical as that provided earlier in connection with nozzle 336. The dampened material particles pass from conduit 356 through connecting flanges, as at 606, to enter an input port assembly 608 of a cyclone separator, shown generally at 610. Cyclone separator 610 is formed in conventional manner, incorporating an internally disposed plug 612, an exhaust fan 614 and air outlet conduit 616. During operation, wetted paper and plastic materials enter the separator and assume a vortex form of movement, gradually losing velocity until exiting through outlet port 618. Port 618 is connected through coupling flanges 620 to the input of an aspirator shown generally at 624. Aspirator 624 is configured in the same manner as that shown at 142 in FIG. 2B and, accordingly, includes a plenum chamber 630 communicating with a supply of pressurized air, depicted only generally by arrow 632. The vertically oriented portion of the chamber of aspirator 624 leads to an exit port 634 through which dampened paper particles exit more or less along a direct gravitational vector. The lighter plastic particles of the material entering the aspirator are blown through upwardly disposed exit port 636 to pass through a conduit 638. Connection between exit port 636 and conduit 638 is provided by flange coupling 640.

Dampened paper particles passing through exit port 634 are directed through a conduit 642 to the feed or entrance hopper 644 of a rotary drier depicted generally at 646. Drier 646 serves to remove a significant amount of the moisture content of the paper particles, whereupon the thus dried particles are conveyed by a pneumatic conveyer represented by arrow 654 to a storage tank 656 (FIG. 3B). Drying of the paper particles generally takes place in the presence of atmospheric air and under agitation at an elevated temperature to avoid the occurence of spontaneous combustion phenomena and the like during storage thereof. Temperatures utilized during this drying step generally are selected as about 250° F. From storage tank 656, the paper materials pass through a conduit 658 to enter the collection chamber 660 of a paper baler represented generally at 662. In conventional manner, as chamber 660 is filled, a hydraulically actuated piston 664 compresses the collected material and urges it into a wrapping or baling chamber 666 for recycling disposition.

Plastic particles passing along conduit 638 are introduced, as in the case of the embodiment of FIG. 2B, to a cyclone separator represented generally at 362. This separator performs in identical fashion as that described in connection with FIG. 2B. Accordingly, plastic materials collected are passed through conduit 372 to be baled at baler 376 and appropriately disposed of.

Since certain changes may be made in the above-described system and process without departing from the scope of the invention herein, it is intended that all matter contained in the description thereof or shown in the accompanying drawings shall be interpreted as illustrative and not in a limiting sense.

I claim:

1. A system for treating solid waste by composting the organic material thereof, comprising:
   receiving station means for receiving untreated waste material;
   input transfer means for moving said untreated waste material from said receiving station means at a select transfer rate;
   comminution means for comminuting said waste material to derive a size limited material having a select maximum average particle size;
   feedback means from said comminution means to adjust the select transfer rate to avoid overloading said comminuting means;
   means for mixing said size limited material with water moisture, by the substantially non-destructive agitation thereof over an interval of time selected to derive a substantially uniform moisture content for said size limited material in the range of about 50–60% by weight;
   macerator means for converting said size limited material of select moisture content into a material of pulp-characterized consistency said conversion being carried out without the substantial further addition of water and said material of pulp-characterized consistency having a moisture content remaining moisture optimized for said aerobic digestion; and
   digester means for inducing the aerobic decomposition of said material of pulp-characterized consistency.

2. The system for treating solid waste of claim 1 including means for introducing said water moisture to said mixing means as a water-born sludge.

3. The system of claim 1 in which said mixing means comprises a pug mill.

4. The system of claim 1 in which said comminution means is configured to derive a said size limited material having a maximum average particle size exhibiting an equivalent diameter of about 6 inches.

5. The system of claim 1 in which said macerator means comprises a cage mill.

6. The system of claim 1 including means for transferring said material of pulp-characterized consistency substantially directly to said digester means.

7. The system of claim 1 further comprising separation means configured to receive said size limited material from said comminution means and including a magnetically actuated stage for removing ferrous metal material therefrom and air classification means including a stage for removing heavy inorganic characterized materials therefrom and a stage for removing plastic-characterized materials therefrom.

8. The system of claim 7 in which:
   said air classification means includes means for wetting said size limited material to an extent equal to or less than that amount of moisture required to provide said uniform select moisture content; and
   said separation means includes an aspirator stage configured and arranged to remove paper characterized materials from said size limited material.

9. The system of claim 1 in which:
   said receiving station means is configured and arranged for temporarily retaining said untreated waste material within a substantially enclosed environment of atmospheric air;
   said digester means is configured for inducing said aerobic decomposition at least in part by means forcibly transferring oxygen laden air through said material of pulp-characterized consistency; and
   including means for transferring said atmospheric air from said enclosed environment to said digester means air transfer means.

10. A system for treating solid waste by composting the organic material thereof, comprising:
    receiving station means for receiving untreated waste material;
    input transfer means for moving said untreated waste material from said receiving station means at a select transfer rate;
    comminution means for comminuting said waste material to derive a size limited material having a select maximum average particle size;
    feedback means from said comminution means to adjust the select transfer rate to avoid overloading said comminuting means;
    at least one pug mill for mixing said size limited material with water moisture, the quantity of said water moisture being selected to derive a substantially uniform moisture content for said size limited material within a range selected for enhancing aerobic digestion;
    at least one cage mill configured for receiving said size limited material of select moisture content and converting it into a material of pulp-characterized consistency; and
    digester means for inducing the aerobic decomposition of said material of pulp-characterized consistency.

11. The system of claim 10 in which said pug mill is configured for deriving a said moisture content uniformly dispersed within said size limited material and within a range of about 50–60% by weight.

12. The system of claim 10 including means for introducing at least a portion of said water moisture to said pug mill as a water-born sludge.

13. The system of claim 10 in which said comminution means if configured to derive a said size limited material having a maximum average particle size exhibiting an equivalent diameter of about 6 inches.

14. The system of claim 13 further comprising separation means configured to receive said size limited material from said comminution means and including a magnetically actuated stage for removing ferrous metal material therefrom and air classification means including a stage for removing heavy inorganic characterized materials therefrom and a stage for removing plastic-characterized materials therefrom.

15. The system of claim 14 in which:
    said receiving station means is configured and arranged for temporarily retaining said untreated waste material within a substantially enclosed environment of atmospheric air;
    said digester means is configured for inducing said aerobic decomposition at least in part by means forcibly transfering oxygen laden air through said material of pulp-characterized consistency; and
    including means for transferring said atmospheric air from said enclosed environment to said digester means air transfer means.

16. The system of claim 15 including means for transferring said material of pulp-characterized consistency substantially directly to said digester means.

17. The system of claim 15 in which:
said air classification means includes means for wetting said size limited material to an extent equal to or less than that amount of moisture required to provide said uniform select moisture content; and
said separation means includes an aspirator stage configured and arranged to remove paper characterized materials from said size limited material.

* * * * *